Patented Sept. 15, 1953

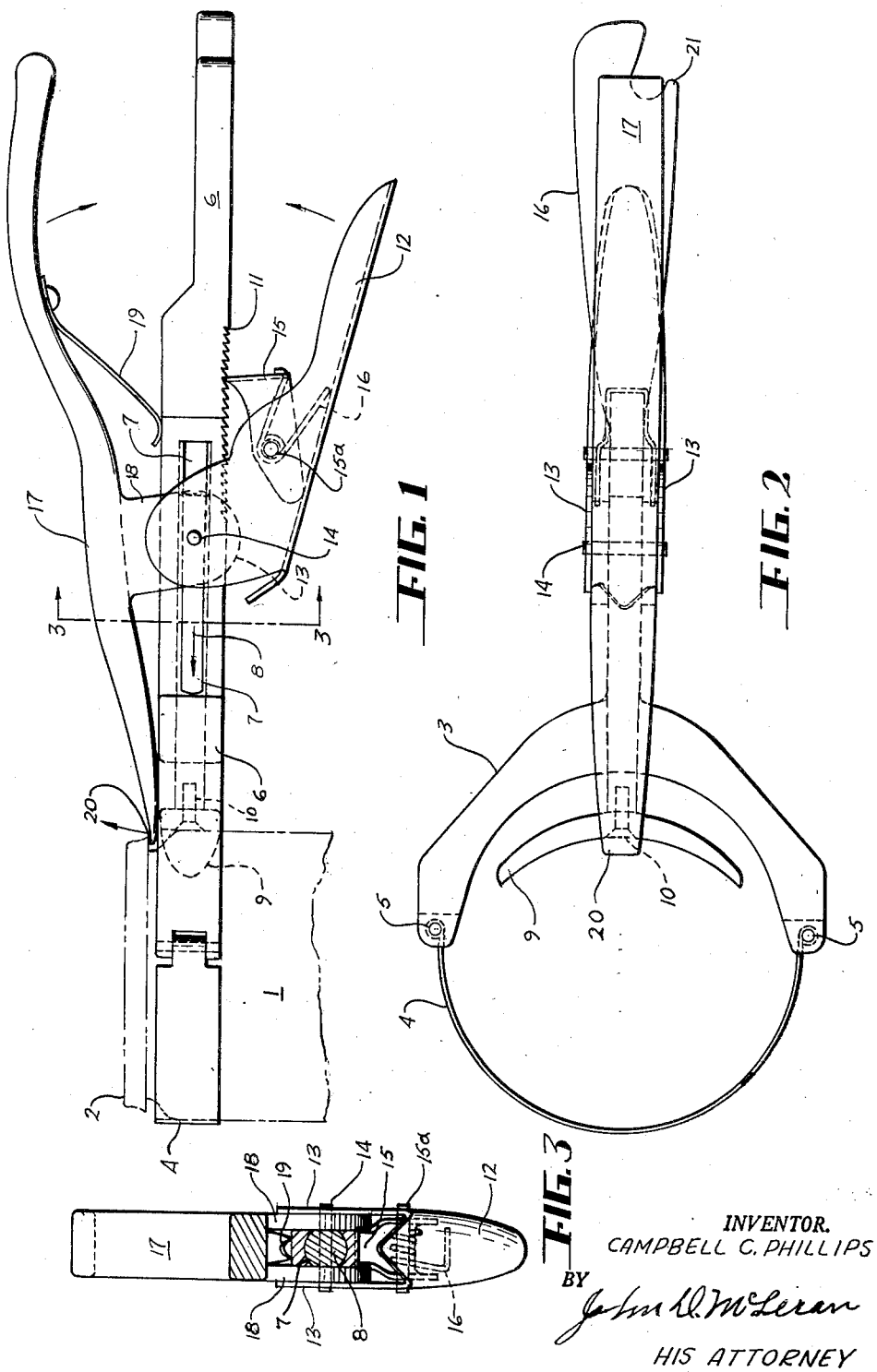

2,651,957

UNITED STATES PATENT OFFICE 2,651,957

CLOSURE REMOVER WITH CONTAINER GRIPPING MEANS

Campbell C. Phillips, Dayton, Ohio

Application August 9, 1951, Serial No. 241,061

2 Claims. (Cl. 81—3.36)

This invention relates to improvements in lid removing devices and has for an object to provide a lid remover that is adapted to remove screw tops or tops of the slip on type.

It is also an object of this invention to provide a can opener adapted to be operated by one hand of the person who is manipulating the device.

These and other objects and advantages will appear from the following description taken in connection with the drawings, in which—

Figure 1 is a side elevation of the lid removing device applied to a can having a slip on type of lid.

Figure 2 is a top plan view of the lid removing device shown in Figure 1.

Figure 3 is in section on line 3—3 of Figure 1.

The numeral 1 is used to designate a jar or can from which a lid is to be removed. This jar, as shown, has a lid of the slip on type which this device is well adapted to remove. The numeral 2 is used to designate a slip on type cap. The numeral 3 is used to designate an arcuate head adapted to engage or fit around about one-half of the can below the cap. Attached to this head 3 is a semi-circle strap 4 pivoted at each end to one end of the head 3 as indicated by the numeral 5 which may be a pin or small bolt. A handle 6 at one end is formed integral with the head 3. The handle is provided with a pair of diametrically opposed longitudinal slots 7 communicating with a longitudinal axial bore within which slides a slide or gripping bar 8 which is attached at one end by a screw 10 to an arcuate gripper 9 which cooperates with the strap 4 in either gripping the lid or top of the can. On the under side of the handle is a plurality of teeth 11. Pivoted to the slide bar 8 is a gripping lever 12 which operates the gripping bar and has extended upwardly thereon and forming a U-shaped member a pair of ears 13 adapted to fit on opposite sides of the handle and is pivotly connected to the slide gripping bar 8 by means of an axle or pivot 14. Pivoted to the gripping bar and between the ears 13 is a U-shaped dog or pawl 15 pivotly connected to the ears 13 by means of a bolt or pivot point 15a.

Mounted upon this pin or axle 15a is a coil spring 16, one end of which engages the dog and the other end engages the gripping lever 12. It will be observed that this lever and pawl serves as a kind of a toggle connection between teeth 11 and the bar 8, so by manipulating lever 12 the slide bar 8 will move and carry with it the gripper 9 against the jar or cap. Mounted upon top of the handle is an operating lever 17 adapted to engage under the edge of the lid for prying it off. Extended downwardly from the lever 17 is a pair of ears 18 adapted to fit within the ears 13 and between the ears 13 and the handle. This operating lever is urged upward with regard to the handle by means of a spring 19. This lever is pivotly supported by the pin 14 and extended longitudinally of the handle with an end 20 adapted to engage under the lid as shown in Figure 1 for the purpose of removing the lid by pressing down on the outer handle of the operating lever. The numeral 21 is used to designate a lip formed on the handle for an additional cap removing instrumentality.

In practice this tool may be used for removing a slip on top or lid such as that shown in Figure 1 and indicated by the numeral 2, or it may be applied to a screw top in which case the strap 4 and the head 9 will engage the screw top and by manipulating the handle the top is screwed off.

The apparatus may be placed around the top of a jar and when properly placed the lever 12 is moved upward toward the handle thereby pressing the head 9 away from the head 3 to grip the top of the jar. When the jar is properly gripped as shown in Figure 1, the lever 17 is manipulated to push the lid off the top of the jar. This is done by gripping the outer end of the lever 17 and forcing it toward the handle.

The bar to which the head 9 is attached is moved outward by means of the toggle connection formed by the lever 12 and the pawl 15.

What I claim is:

1. In a lid remover, a handle, a member slidably mounted in the handle, cooperating members on the handle and the slidable member to grip a jar adjacent its lid and a lever pivoted to the slidable member and engaging the handle whereby upon operation of the lever the cooperating members will grip the jar, and a lever on the slidable member to remove the lid.

2. In a lid remover, a handle having thereon an arcuate head, a strap attached at its ends to the head, a slide bar in the handle, an arcuate gripper on the slide bar cooperating with the strap to grip a jar lid or top of a jar, a pivot pin on the slide bar, a lid removing lever on the pin, and means on the pin cooperating with the handle to move the slide bar to grip the jar and to simultaneously move the lever on the pin to force it under the lid.

CAMPBELL C. PHILLIPS.

References Cited in the file of this patent

UNITED STATES PATENTS

| Number | Name | Date |
| --- | --- | --- |
| 446,545 | Blodgett | Feb. 17, 1891 |
| 1,396,373 | Laskowski | Nov. 8, 1921 |
| 1,396,867 | Miller | Nov. 15, 1921 |
| 1,711,225 | Crowell | Apr. 30, 1929 |
| 2,000,962 | Krag | May 14, 1935 |
| 2,427,353 | Gagesteyn | Sept. 16, 1947 |